United States Patent
Gomm et al.

(10) Patent No.: US 8,513,837 B2
(45) Date of Patent: Aug. 20, 2013

(54) ELECTRICAL INTERRUPT SYSTEM AND METHOD FOR USE IN A HYBRID SYSTEM

(75) Inventors: Ralf Gomm, Cleveland, OH (US); Dale Vanderlaan, Kalamazoo, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 330 days.

(21) Appl. No.: 12/819,276

(22) Filed: Jun. 21, 2010

(65) Prior Publication Data

US 2011/0024255 A1 Feb. 3, 2011

Related U.S. Application Data

(60) Provisional application No. 61/229,036, filed on Jul. 28, 2009.

(51) Int. Cl.
*F16P 3/00* (2006.01)
*H02H 11/00* (2006.01)
*H02H 7/06* (2006.01)
*H02H 7/08* (2006.01)
*B60L 3/00* (2006.01)

(52) U.S. Cl.
USPC ............ 307/328; 307/9.1; 307/10.7; 307/326; 180/65.265

(58) Field of Classification Search
None
See application file for complete search history.

(56) References Cited

U.S. PATENT DOCUMENTS

| | | | | |
|---|---|---|---|---|
| 3,656,045 A | * | 4/1972 | Frezzolini et al. | 320/136 |
| 4,132,942 A | * | 1/1979 | Yamamoto | 320/136 |
| 4,701,688 A | * | 10/1987 | Guim | 320/105 |
| 4,724,332 A | * | 2/1988 | Finger | 307/10.7 |
| 5,293,076 A | * | 3/1994 | Fukui | 290/40 C |
| 5,562,173 A | * | 10/1996 | Olson | 180/53.4 |
| 5,664,635 A | * | 9/1997 | Koga et al. | 180/65.245 |
| 6,097,107 A | * | 8/2000 | Ikeda | 307/10.7 |
| 6,223,844 B1 | * | 5/2001 | Greenhill et al. | 429/429 |
| 6,369,460 B1 | * | 4/2002 | Endoh et al. | 307/31 |
| 2004/0004483 A1 | * | 1/2004 | Hazelton | 324/522 |
| 2006/0137643 A1 | * | 6/2006 | Thompson et al. | 123/179.4 |
| 2007/0139005 A1 | * | 6/2007 | Osawa | 320/115 |
| 2007/0158120 A1 | * | 7/2007 | Lee et al. | 180/65.2 |
| 2007/0181355 A1 | * | 8/2007 | Harris | 180/65.2 |
| 2008/0039260 A1 | * | 2/2008 | Hwang et al. | 475/5 |

* cited by examiner

*Primary Examiner* — Hal Kaplan
(74) *Attorney, Agent, or Firm* — Renner, Otto, Boisselle & Sklar, LLP

(57) ABSTRACT

An electrical interlock system for including a power takeoff device operable in a first state to transfer mechanical energy from an associated combustible engine to an associated electric motor and/or generator and operative in a second state to prevent the transfer of mechanical energy from the associated combustible engine to the associated electric motor and/or generator. A relay having a first switch and an energizable portion, is coupled to the power takeoff device, the electric motor and an associated power source, such that when the energizable portion is receiving electrical power from the associated power source, the power takeoff device is in the first state and when the energizable portion is not receiving electrical power from the associated power source, the power takeoff device is in the second state.

22 Claims, 6 Drawing Sheets

ELECTRICAL INTERRUPT SYSTEM AND METHOD FOR USE IN A HYBRID SYSTEM

RELATED APPLICATION DATA

The present application claim the benefit of the filing date of U.S. Provisional Patent Application Ser. No. 61/229,036 filed Jul. 28, 2009, which is incorporated herein by reference in its entirety.

FIELD OF INVENTION

The present invention relates to an electrical interrupt system for detecting a fault, wherein the electrical interrupt isolates electrical current and/or voltage associated with one or more direct current storage units when a fault condition is detected.

BACKGROUND OF THE INVENTION

Systems employing circuits for transmitting electrical power may pose a hazard in the event of a failure mode that results in exposing high voltage wires or contacts of the system. Some known systems provide high voltage interlocks that open an electrical circuit to prevent current flow. One such interlock system is described in U.S. Pat. No. 7,084,361.

SUMMARY OF THE INVENTION

When a portion of the electrical system is compromised for any reason, it is desirable to prevent any further use of the electric system until proper service of the system is performed. A system for preventing premature or inadvertent contact with components of an electrical system having elevated voltage levels is particularly desirable. In one aspect of the present invention, if a high voltage cable is unplugged, cut or otherwise severed, regardless the location of the high voltage cable, all high voltage connectors will open to prevent the transfer of high current discharge to the surrounding environment.

One aspect of the invention relates to an electrical interlock system including: a power takeoff device operable in a first state to transfer mechanical energy from an associated combustible engine to an associated electric motor and/or generator and operative in a second state to prevent the transfer of mechanical energy from the associated combustible engine to the associated electric motor and/or generator; and a relay coupled to the power takeoff device, the associated electric motor and/or generator and an associated power source, wherein the relay includes a first switch and an energizable portion, such that when the energizable portion is receiving electrical power from the associated power source, the power takeoff device is in the first state and when the energizable portion is not receiving electrical power from the associated power source, the power takeoff device is in the second state.

Another aspect of the invention relates to a method for generating an electrical interrupt in a system having a combustible engine and an electric motor, the method including: forming a low voltage electrical interrupt loop by coupling an electrical interrupt loop in serial to each electrical component containing at least one high voltage contact and one or more direct current storage units; detecting a fault condition in the electrical interrupt loop, wherein the fault condition generates an open circuit in the interrupt loop; performing a remedial action to ensure all contacts of each of the electrical components are touch safe prior to removal of any connectors from the at least one high voltage contact of the electrical components.

Another aspect of the present invention relates to a method for generating an electrical interrupt, the method including: receiving electrical power from an associated secondary direct current power source at an energizable device; controlling a power takeoff device such that when the energizable device is receiving electrical power from the associated secondary direct current power source, the power takeoff device is operable in a first state to transfer mechanical energy from an associated combustible engine to an associated electric motor and/or generator and when the energizable device is not receiving power from the associated secondary direct current power source a fault is detected and the power takeoff device is operable in a second state to prevent the transfer of mechanical energy from the associated combustible engine to the associated electric motor and/or generator.

Another aspect of the invention relates to an electrical interrupt system for use in a hybrid vehicle system, the system including: a power takeoff device; an electric motor operatively coupled to the power takeoff device; an inverter coupled to the electric motor, wherein the inverter is operable to receive power from the electric motor and provide power to the electric motor; and an electrical interrupt loop including at least one energizable electrical component associated with a least one of the power takeoff device and/or the inverter, wherein the energizable electrical component is energizable in response to receiving electric power from an associated battery operably coupled in the electrical interrupt loop, such that an interrupt condition is generated when the energizable electrical component is not receiving electric power from the associated battery.

Another aspect of the invention relates to an electrical interrupt for use in a system having a plurality of direct current storage units, the system including: one or more electrical components having at least one high voltage contact for transferring current to and/or from one or more of a plurality of direct current storage units; an electrical interrupt circuit operatively coupled in serial to each electrical component containing a high voltage contact in the system and each of the direct current storage units, wherein an electrical interrupt is triggered by an open circuit in the electrical interrupt circuit and the electrical interrupt results in isolation of each of the associated direct current storage units.

Further features of the invention will become apparent from the following detailed description when considered in conjunction with the drawings.

DETAILED DESCRIPTION

Figure 1:
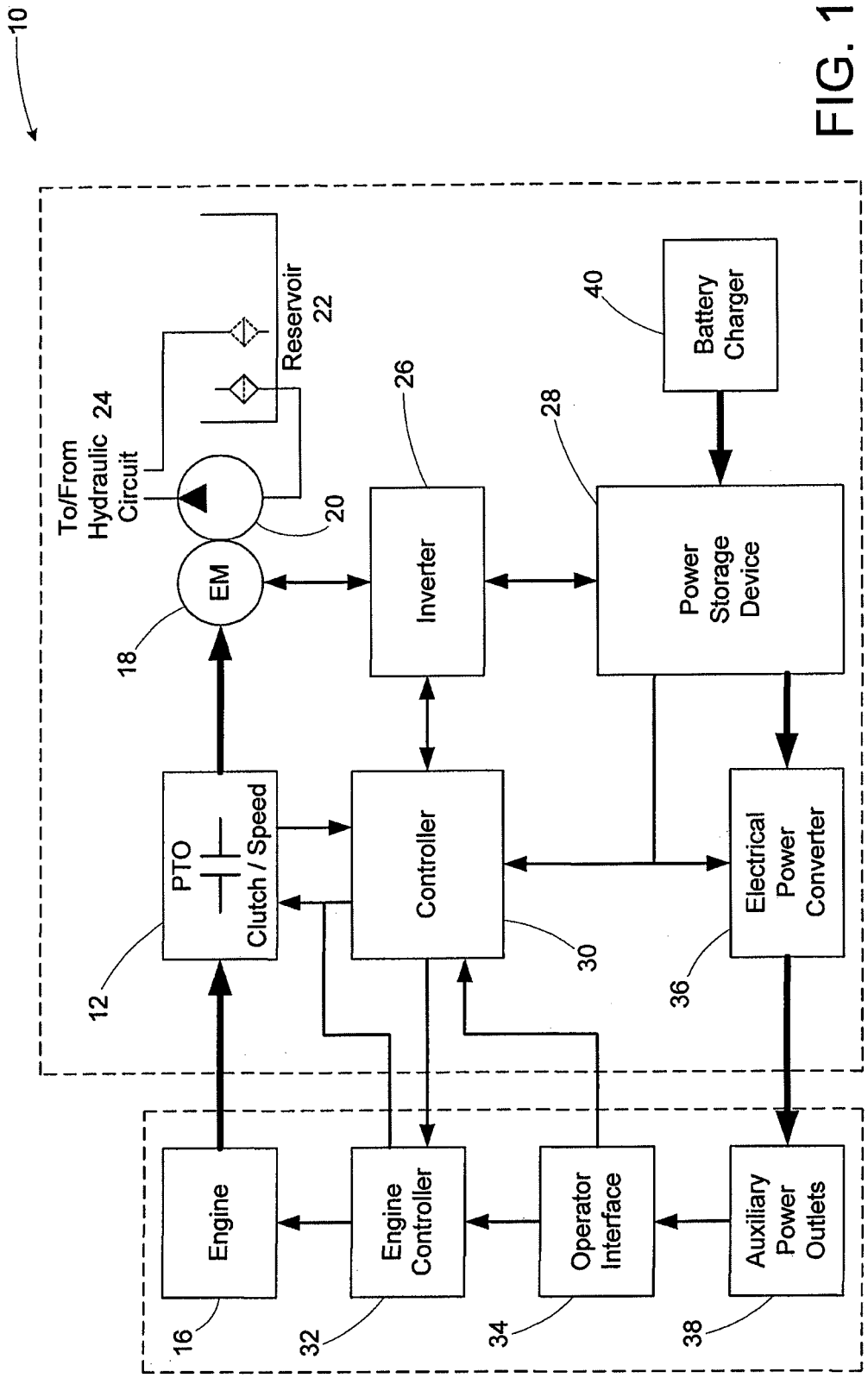
FIG. 1 is an exemplary block schematic drawing of a system in accordance with aspects of the present invention.

In the figures, elements having an alphanumeric designation may be referenced herein collectively or in the alternative, as will be apparent from context, by the numeric portion of the designation only. Further, the constituent parts of various elements in the figures may be designated with separate reference numerals that shall be understood to refer to that constituent part of the element and not the element as a whole. General references, along with references to spaces, surfaces, dimensions, and extents, may be designated with arrows. Furthermore, features or aspects of one figure may be incorporated in other figures.

Referring now to FIG. 1, an exemplary hybrid system 10 in accordance with aspects of the present invention is illustrated. The hybrid system 10 is configured for providing hydraulic power for use in the system 10. The system 10 includes a transmission mounted power takeoff device 12. The power take off device 12 includes an actuable clutch 14. As will be described below, the clutch 14 of the power takeoff device 12 is actuable by energizing a solenoid. The power takeoff device 12 is driven by a prime mover 16. In one embodiment, the prime mover 16 is a combustion engine. The combustion engine 16 transfers power to the transmission (not shown) which, in turn, transfers power to the power takeoff device 12. When the clutch 14 of the power takeoff device 12 is in an open condition, no mechanical energy is transferred to the system beyond the power takeoff device 12. When the clutch 14 of the power takeoff device 12 is engaged (or in a closed position), mechanical power is transferred by the power takeoff device 12 resulting in rotation of an output shaft of the power takeoff device.

FIG. 1 schematically illustrates the output shaft of the power takeoff device 12 as being connected to an electric motor/generator 18 and a hydraulic pump 20. The electric motor/generator 18 and the hydraulic pump 20 may be formed as an integral package or, alternatively may be coupled in series so that an input shaft of both the electric motor/generator and the hydraulic pump are coupled together. When mechanical energy is transferred by the power takeoff device 12 to the electric motor/generator 18, a rotor portion of the electric motor/generator 18 rotates relative to a stator portion of the electric motor/generator 18. This rotation of the rotor portion relative to the stator portion results in the generation of electric power having an alternating current. When the power takeoff device 12 transfers power via its output shaft to the hydraulic pump 20, the hydraulic pump 20 operates to pump hydraulic fluid from a reservoir 22 to a hydraulic circuit 24 for use, such as for use in the hybrid system 10 by extending or retracting a cylinder, for example. Hydraulic fluid flowing out of the hydraulic circuit 24 may flow back to the hydraulic reservoir 22.

As shown in FIG. 1, the hybrid system 10 includes an inverter 26 and a power storage device 28. The inverter 26 is electrically connected to the electric motor/generator 18 and is adapted to receive power from and provide power to the electric motor/generator 18. The inverter 26 is also electrically connected to the power storage device 28 and is adapted to receive power from and provide power to the electric storage device 28. The electric storage device 28 may take a variety of forms including one more batteries, capacitors, etc.

When the rotor portion of the electric motor/generator 18 rotates relative to the stator portion, electric power that is generated by the electric motor/generator 18 is provided to the inverter 26. Electric power provided to the inverter 26 from the electric motor/generator is converted at the inverter 26 from alternating current to direct current, is conditioned as needed, and is provided to the power storage device 28 for storage. Thereafter, with the clutch 14 of the power takeoff device 12 in an open condition, the electric motor/generator 18 may receive power from the power storage device 28 via the inverter 26 to operate as a motor to power the hydraulic pump 20.

FIG. 1 further discloses a controller 30, an engine controller 32, and an operator interface 34. The engine controller 32 is responsive to inputs at the operator interface 34 for controlling the combustion engine 16 of a vehicle in which the hybrid system 10 may be used. Controller 30 may form a portion of the engine controller 32 or, alternatively, may be a separate controller. Controller 30 may be a microprocessor based controller or, alternatively, may be an application specific integrated circuit (ASIC) or a similar type device. Controller 30 is responsive to inputs into the operator interface 34 for controlling the power takeoff device 12, the inverter 26, the power storage device 28, and, optionally, further options such as an electric power converter 36, which is adapted to convert the electric power provided from the power storage device 28 to a specific voltage for operation of auxiliary power outlets 38.

By controlling the power takeoff device 12, the inverter 26, and the power storage device 28, the controller 30 determines whether electrical power is being generated by the electric motor/generator 18 for storage in the power storage device 28 or whether the power storage device 28 is providing power to the electric motor/generator 18 to drive the hydraulic pump 20. FIG. 1 further illustrates battery charger 40 that enables the power storage device 28 to be charged by an external power source, such as, for example an electric outlet. It is noted that battery charger 40 may be attached directly to the inverter 26, depending upon the design of the battery charger.

The system of FIG. 1 provides three primary modes of operation. In a first mode of operation, the power takeoff device 12 operates with the clutch in a closed position. When the clutch of the power takeoff device 12 is in a closed position, rotation of the output shaft of the power takeoff device 12 causes rotation of a shaft of the electric motor/generator 18 and a shaft of the hydraulic pump 20. Rotation of the shaft of the electric motor/generator 18 results in the rotor portion rotating relative to the stator portion and electric power being generated. The electric power generated by the electric motor/generator 18 is provided to the inverter 26 and then is provided to the power storage device 28 for storage. Rotation of the shaft of the hydraulic pump 20 results in hydraulic fluid being drawn from the reservoir 22 and provided to the hydraulic circuit 24.

In a second mode of operation, the clutch 14 of the power takeoff device 12 also is closed. In the second mode of operation, the power storage device 28 is completely charged and there is no need for further storage of electric power. In this mode of operation, the output shaft of the power takeoff device 12 rotates the rotor portion of the electric motor/generator 18 relative to the stator portion. The resulting electric power is not transferred to the inverter 4, but instead, the resulting electric power is not captured and may be lost, used or stored in another desirable manner. In the second mode of operation, the hydraulic pump 20 is driven by the power take off device 12 for drawing hydraulic fluid from the reservoir 22 and providing the fluid to the hydraulic circuit 24.

In a third mode of operation, the clutch 14 of the power takeoff device 12 is in an open condition. In this third mode of operation, electric power is provided from the power storage device 28 through the inverter 26 to the electric motor/generator 18, which operates as an electric motor. The electric motor/generator 18 drives the hydraulic pump 20 to draw fluid from the reservoir 22 and provide the hydraulic fluid to the hydraulic circuit 24.

Figure 2:
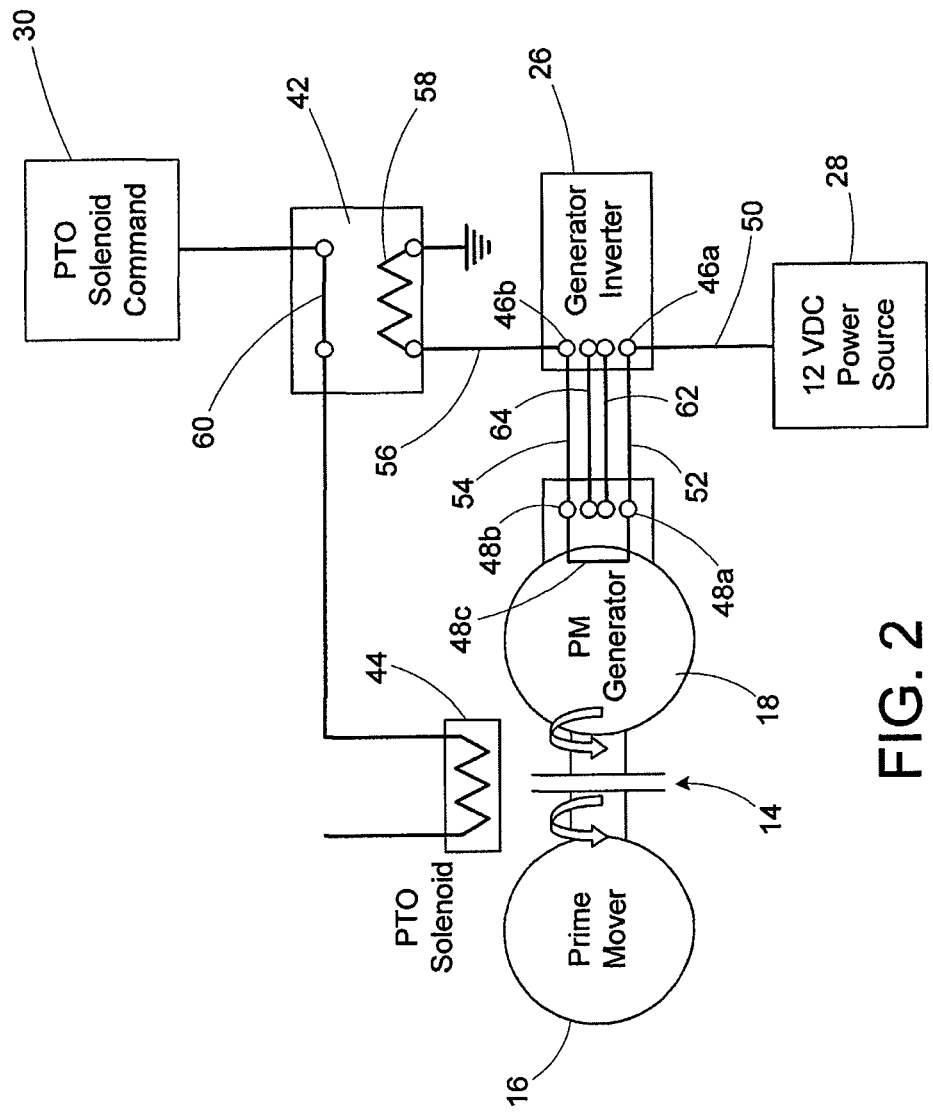
FIGS. 2 and 3 are exemplary block diagrams illustrating an electrical interrupt in accordance with aspects of the present invention.

FIG. 2 illustrates an electrical interrupt loop in accordance with aspects of the present invention. FIG. 2 schematically illustrates the prime mover (e.g., combustion engine) 16, the clutch 14 of power takeoff device 12, the electric motor/generator 18, the inverter 26, a secondary power source 21, which is illustrated as a 12 volt DC battery, and the controller 30. Additionally, FIG. 2 illustrates a relay 42 and a solenoid 44. The solenoid 44 is energizable to close the clutch 14 of the power takeoff device 12. The clutch 14 of the power takeoff device 12 is in a normally open condition and is closed upon energizing the solenoid 24.

The relay 42 is interposed between the controller 30 and solenoid 44. The relay 42 also forms a portion of the interrupt loop according to a first embodiment of the invention. The interrupt loop of FIG. 2 also includes the secondary power source 28 and an interrupt loop path, which will be described in additional detail below.

In the embodiment of FIG. 2, the interrupt loop path extends between the power storage device 28 and the relay 42 via the inverter 26 and the electric motor/generator 18. FIG. 2 illustrates a pair of electrical contacts 46*a* and 46*b* of the interrupt loop path located on the inverter 26 and a pair of electrical contacts 48*a* and 48*b* of the interrupt loop path located on the electric motor/generator 18. Further, within the electric motor/generator 18, the electrical contacts 48*a* and 48*b* for the interrupt loop path are electrically connected by conductor 48*c*. The interrupt loop path passes from the secondary power source 28 to the electrical contact 46*a* of the inverter 26 via conductor 50. The interrupt loop path then is directed from electrical contact 46*a* of the inverter 26 to electrical contact 48*a* of the electric motor/generator 18 via conductor 52. The interrupt loop path passes from electrical contact 48*a* to electrical contact 48*b* via conductor 48*c* and then, extends from electrical contact 48*b* to electrical contact 46*b* via conductor 54. From electrical contact 46*b*, the interrupt loop path extends to relay 42 via conductor 56.

When all portions of the interrupt loop are intact and properly connected at the various contacts (46*a*, 46*b*, 48*a*, 48*b*), electric power passes from the secondary power source 28 through the relay 42. In the event that any of the conductors (50, 52, 48*c*, 54 or 56) of the interrupt loop path are severed or unplugged from an associated contact (46*a*, 46*b*, 48*a*, 48*b*), electric power is prevented from passing from the secondary power source 28 to the relay 42.

The relay 42 includes an energizable portion 58 and a switch portion 60. When the energizable portion 58 receives electric power from the secondary power source 28, the switch portion 60 moves to a closed condition, as illustrated in FIG. 2. When the energizable portion 60 fails to receive electric power from the secondary power source 28, the switch portion 60 of the relay 42 is in the open condition, as shown in FIG. 3.

The switch portion 60 of the relay 42 is interposed between the controller 30 and the solenoid 44 associated with the clutch 20 of the power takeoff device 12. When the switch portion 60 is in the closed condition, as illustrated in FIG. 2, the controller 30 may provide power to the solenoid 44 for energizing the solenoid and closing (or engaging) the clutch 14. When the switch portion 60 of the relay 42 is in the open condition illustrated in FIG. 3, the controller 30 can no longer energize the solenoid 44 and the clutch 14 either remains in or moves to an open (disengaged) condition.

Figure 3:
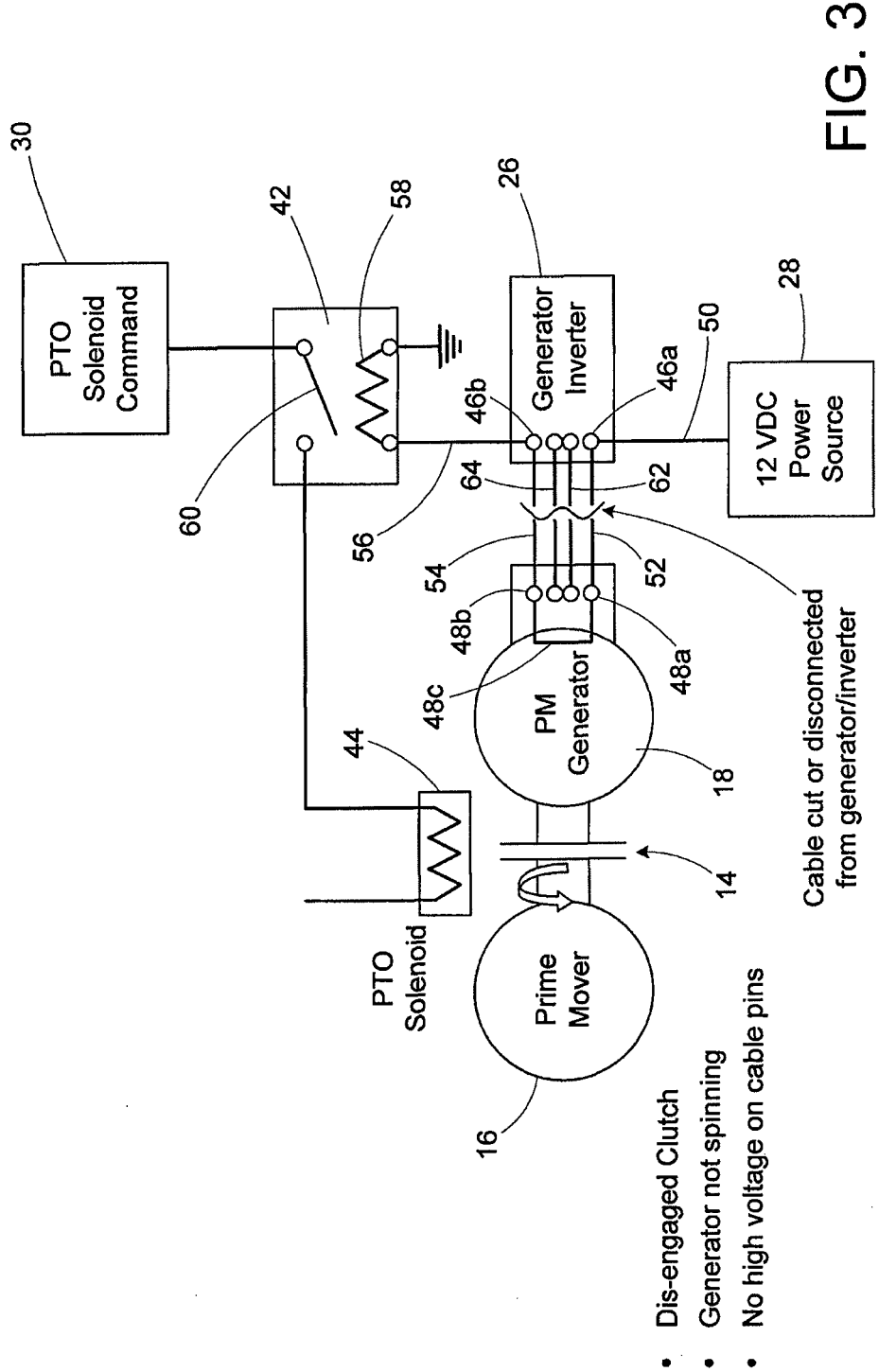

In a failure situation in which the interrupt loop is compromised in any way, such as being severed or unplugged, no power passes from the secondary power source 28 to the relay 42 and thus, the switch portion 60 of the relay 42 is opened (or if already open, remains open), as illustrated in FIG. 3. As a result of switch portion 60 being in an open condition, the solenoid 44 associated with the clutch 14 of the power takeoff device 12 may not be energized. This prevents closure of the clutch 14 and operation of the power takeoff device 12 for driving the electric motor/generator 2 during this failure situation. As a result, in the event of a failure situation, an operator of the system will be prevented from operating the system in the first mode of operation in which the power takeoff device 12 drives the hydraulic pump 20 and the rotor portion of the electric motor/generator 18 rotates for providing electrical power for storage in the power storage device 28. Also, when the interrupt loop fails to provide electric power to the relay 42, the second mode of operation (i.e., power takeoff drives the electric motor/generator 18 and the hydraulic pump 20 but no power is captured) is also prevented.

In an exemplary embodiment, the conductors 52 and 54 of the interrupt loop path are formed integrally with and in close proximity to the electric cables 62 and 64 that electrically connect the inverter 26 and the electric motor/generator 18. Thus, should an event occur that severs one or more of electric cable 62 and/or 64, the associated conductors 52 and 54 likely will also be severed. Additionally, in the preferred embodiment, connections to the electrical contacts 46*a*, 46*b*, 48*a* and 48*b* are formed in plugs of the electric cables 62 and 64. Thus, if an electric cable 62 or 64 is unplugged, the connection between the electrical contact (46*a*, 46*b*, 48*a* or 48*b*) and its associated conductor (50, 52, 54, or 56) is also unplugged. Thus, in the event of a failure situation (i.e., severing or unplugging of a portion of the interrupt loop path), operation of the system by driving the power takeoff device 12 is prevented.

In one embodiment of the invention, a single cable may interconnect the inverter 26 and the electric motor/generator 18. This cable includes cables 62 and 64 for electrically connecting the electric motor/generator 18 and the inverter 26 and conductors 52 and 54 of the interrupt loop path. When one such cable is provided, the inadvertent unplugging of the cable or damage to the cable that opens the interrupt loop path results in the clutch 14 of the power takeoff device 12 either opening or remaining open such that mechanical power from the prime mover 16 is not passed to the electric motor/generator 18 or the hydraulic pump 20 by the power takeoff device 12.

In summary, since the electric motor/generator 18 and hydraulic pump 20 either share the same shaft or have shafts which are coupled together, any operation of the hydraulic pump 20 using power transferred by the power takeoff device 12 will result in rotation of the rotor portion of the electric motor/generator 18 relative to the stator portion. Rotation of the rotor portion relative to the stator portion produces high voltage electrical power at the terminals of the electric motor/generator 18. This high voltage electrical power is proportional to the speed of rotation of the rotor portion relative to the stator portion. If, for example, the cables (e.g., cables 62, 64) connecting the electric motor/generator 18 and the inverter 26 are unplugged or have exposed wires due to a failure situation, a potential hazardous condition may occur. The interrupt loop prevents such a situation by preventing engagement of the clutch 14 of the power takeoff device 12 when the interrupt loop path for any reason is open. The interrupt loop path is open when electric power fails to pass from the secondary power source 21 through the relay 42.

Figure 4:
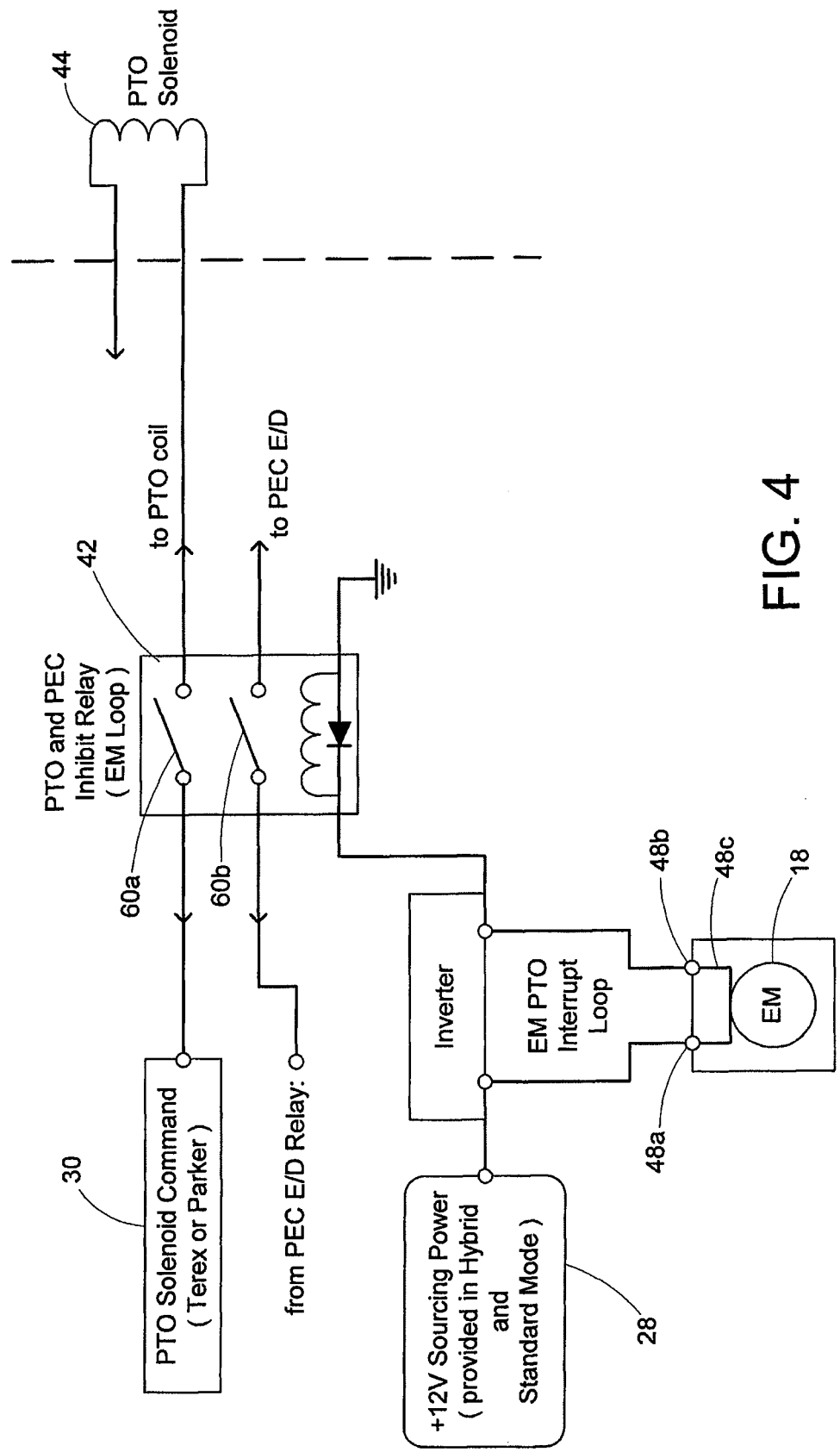
FIG. 4 is an exemplary block diagram illustrating another electrical interrupt in accordance with aspects of the present invention.

Another embodiment of the present invention is illustrated in FIG. 4. In FIG. 4, the relay 42 includes multiple switch portions 60a and 60b. One switch portion 60a of the relay 42, when open, prevents the solenoid 44 associated with the clutch 20 of the power takeoff device 12 from being energized. The other switch portion 40b of the relay 42 is associated with a second energizable actuator (not shown). Any compromise to the interrupt loop path opens both switch portions 60a and 60b. As a result, both the solenoid 44 of the power takeoff device 12 and the second energizable actuator are prevented from actuation in the event of a failure situation (i.e., interrupt loop path being severed or unplugged).

Figure 5:
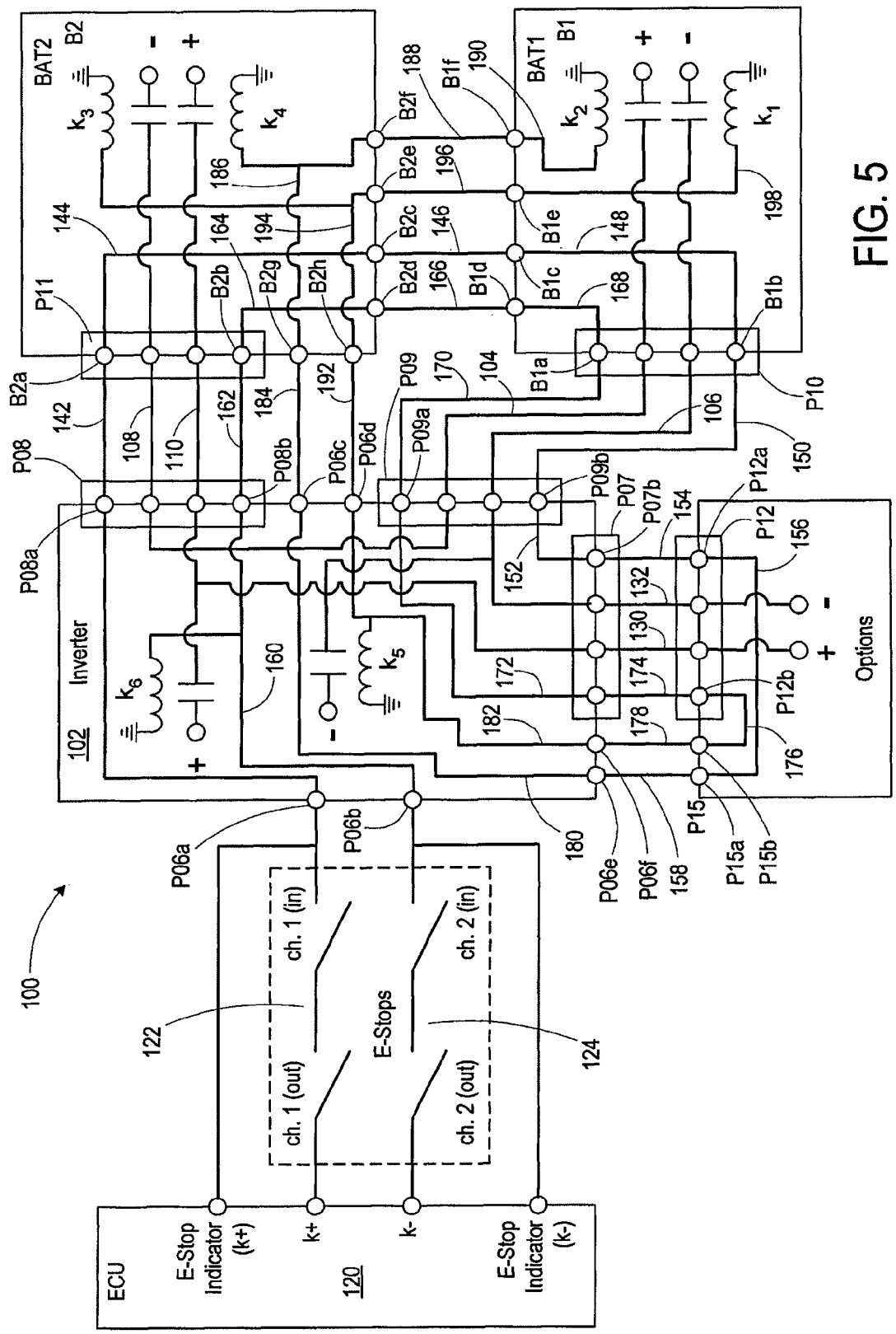
FIG. 5 is an exemplary block diagram illustrating another electrical interrupt for use with a plurality of power storage units in accordance with aspects of the present invention.

FIG. 5 illustrates another embodiment of the present invention for use in a system having a plurality of power storage devices. The system 100 is similar to that illustrated in FIG. 1, but includes multiple power storage units, illustrated as primary and secondary batteries B1 and B2. Due to the increased number of power storage units and the desire to generate a system interlock that isolates all high power contacts upon the occurrence of a fault condition, increased circuitry is required, as set forth below.

With reference to FIG. 5, the inverter 102 is electrically connected to primary battery B1 with cables 104 and 106. The inverter 102 is electrically connected to secondary battery B2 with cables 108 and 110. FIG. 5 illustrates power solenoid switches that power high voltage contactors within the inverter 102 ($k_5$ and $k_6$) and within each of the primary and secondary batteries B1 ($k_1$ and $k_2$) and B2 ($k_3$ and $k_4$). The interrupt loop of FIG. 5 connects these power solenoid switches such that in the event that the interrupt loop is opened at any point, such as by being severed or unplugged, all high voltage contactors of the system open and high voltage is isolated.

In addition to the inverter 102 and the primary and secondary batteries B1 and B2, FIG. 5 further illustrates a controller 120 and multiple emergency stops 122 and 124. Additionally, battery B1 includes a high voltage contact strip P10 having a plurality of electrical high voltage contacts and a plurality of low voltage contacts. The high voltage contact strip P10 for battery B1 includes electrical contacts for cables 104 and 106 and two electrical contacts for the interrupt loop, contacts B1a and B1b. The plurality of low voltage contacts includes contacts B1c, B1d, B1e, and B1f. Battery B2 includes a high voltage contact strip P11 having a plurality of high voltage electrical contacts and a plurality of low voltage contacts. The high voltage contact strip P11 for battery B2 includes electrical contacts for cables 108 and 110 and two low voltage electrical contacts for the interrupt loop, contacts B2a and B2b. The plurality of low voltage contacts includes contacts B2c, B2d, B2e, B2f, B2g and B2h.

The inverter 102 includes two contact strips P08 and P09 and an optional third contact strip P07. The inverter 102 also includes a plurality of low voltage contacts. Contact strip P08 includes electrical contacts for cables 108 and 110 and two electrical contacts for the interrupt loop, contacts P08a and P08b. Contact strip P09 includes electrical contacts for cables 104 and 106 and two electrical contacts for the interrupt loop, contacts P09a and P09b. Optional contact strip P07 includes electrical contacts for high voltage cables 130 and 132 and two electrical contacts for the interrupt loop, contacts P07a and P07b. Other low voltage contacts of the inverter 102 include contacts P06a, P06b, P06c, P06d, P06e and P06f.

The interrupt loop of FIG. 5 includes a primary interrupt loop path and a secondary interrupt loop path. The use of two or more power storage units (e.g., batteries B1 and B2) results in the need for multiple interrupt loop paths for ensuring proper isolation of high voltage in the event of a failure situation. Multiple power storage units may be required when the amount of electrical power to be stored is greater than the capacity of one such power storage unit or, alternatively, for providing symmetric packaging of the system on a vehicle, for example. As the weight of the power storage unit is often high, the use of multiple power storage units allows the designer of the vehicle to package the system in a way in which the weight of the power storage units are symmetric about a center of gravity of the vehicle.

When multiple power storage units are included in the system, a single interrupt loop path such as is described in FIGS. 2, 3, and 4 generally will not operate to isolate all of the high voltage contactors ($k_1$, $k_2$, $k_3$, $k_4$, $k_5$ and $k_6$). For example, with reference to FIG. 5, an interrupt loop path that isolates only the high voltage contactors $k_1$ and $k_2$ associated with the battery B1 will not prevent high voltage from being discharged from the high voltage contactors $k_3$ and $k_4$ of battery B2. Likewise, an interrupt loop path that isolates only the high voltage contactors $k_3$ and $k_4$ of battery B2 will not prevent high voltage from being discharged from the high voltage contactors $k_1$ and $k_2$ of battery B1. With a single interrupt loop path, opening of the interrupt loop path only disconnects the high voltage contactors located downstream of the point of disconnect. The embodiment of FIG. 5 solves this problem by forming an interrupt loop having a primary interrupt loop path and a secondary interrupt loop path.

The primary interrupt loop path extends from a low voltage power source, illustrated as being integral to the controller 120, through the emergency stops 122 and 124 and through each of the contact strips P08, P11, P10, P09 and, optionally, P07. The secondary interrupt loop path provides power to the activating solenoids and extends through each high voltage contactors $k_1$, $k_2$, $k_3$, $k_4$, $k_5$ and $k_6$.

With continued reference to FIG. 5, the primary interrupt loop path includes first and second path portions. The first path portion begins at the low voltage power source and connects to contact P06a via emergency stop 122. The first path is hardwired in inverter 102 as conductor 102 between contacts P06a and P08a. Contact P08a is connected to contact B2a by conductor 142. Within battery B2, contact B2a is connected with contact B2c by conductor 144. Conductor 146 connects contacts B2c of battery B2 and B1c of battery B1. Within battery B1, contact B1c is connected with contact B1b by conductor 148. Contact B1b is connected with contact P09b of the inverter 102 by conductor 150. If optional contact strip P07 is included, conductor 152 connects contacts P09b and P07b for connection through an optional contact strip P12. Conductor 154 connects contacts P07b and P12a and conductor 156 connects P12a to contact P15a. P15a is connected to contact P06e through conductor 158.

The second path portion of the first interrupt loop path begins at the low voltage power source and connects to contact P06b via emergency stop 124. The first path may be hardwired in inverter 102 as conductor 160 between contacts P06b and P08b. Contact P08b is connected to contact B2b by conductor 162. Within battery B2, contact B2b is connected with contact B2d by conductor 164. Conductor 166 connects contacts B2d of battery B2 and B1d of battery B1. Within battery B1, contact B1d is connected with contact B1a by conductor 168. Contact B1a is connected with contact P09a of the inverter 102 by conductor 170. If optional contact strip P07 is included, conductor 172 connects contacts P09a and P07a for connection through an optional contact element P12 and back to contact P06f of the inverter 102 via conductor 174, contact P12b, conductor 176, contact P15b, and conductor 178.

The primary interrupt loop path ends and the secondary interrupt loop path begins within the inverter 102 immediately downstream of contacts P06e and P06f in conductors 180 and 182. When optional contact strips P07 and P12 are not included, conductors 182 and 182 connect to contacts P09b and P09a, respectively, and, the primary interrupt loop path ends and the secondary interrupt loop path begins within the inverter 102 immediately downstream of contacts P09a and P09b in conductors 180 and 182.

The secondary interrupt loop path provides electric power to the solenoids of the high voltage contactors $k_1, k_2, k_3, k_4, k_5$ and $k_6$. Like the primary interrupt loop path, the secondary interrupt loop path includes first and second path portions. The first path portion provides electrical power to the solenoids of high voltage contactors $k_2$, $k_4$, and $k_6$, while the second path portion provides electrical power to the solenoid of high voltage contactors $k_1, k_3,$ and $k_5$. The first path portion of the secondary interrupt loop path includes conductor 180, contact P06c, conductor 184, contact B2g, conductor 186, contact B2f, conductor 188, contact B1f, and conductor 190. The second path portion of the secondary interrupt loop path includes conductor 182, contact P06d, conductor 192, contact B2h, conductor 194, contact B2e, conductor 196, contact B1e, and conductor 198.

In the event that the emergency stop switches 122 and 124 are opened, power through the interrupt loop is immediately prevented and the solenoids associated with the high voltage converters $k_1$, $k_2$, $k_3$, $k_4$, $k_5$ and $k_6$ are all automatically opened. Those skilled in the art will recognize that each high voltage converter $k_1, k_2, k_3, k_4, k_5$ and $k_6$ may have a normally open condition and is may be closed upon energization of its associated power solenoid. When the emergency stop switches 122 and 124 remain closed and power passes through the interrupt loop, energization of each of the power solenoids associated with the high voltage contactors $k_1$, $k_2$, $k_3$, $k_4$, $k_5$ and $k_6$ is possible. In the event that the primary interrupt loop path becomes compromised in any way, such as by being unplugged or severed, electric power is prevented from passing to the power solenoids and, as a result, the high voltage contactors $k_1, k_2, k_3, k_4, k_5$ and $k_6$ are isolated. Therefore, an opening in the primary interrupt loop path results in isolation of all of the high voltage contactors $k_1, k_2, k_3, k_4, k_5$ and $k_6$.

Each embodiment of the interrupt loop described with reference to the drawings either isolates high voltage or prevents the generation of further high voltage electrical power. As described briefly with reference to FIG. 2, the embodiment of FIG. 5 may include cables that integrate the interrupt loop paths into the power cables. Although described with specific reference to the embodiments herein, those skilled in the art should understand that further embodiments of interrupt loops are possible and included within the scope of the present invention.

Figure 6:
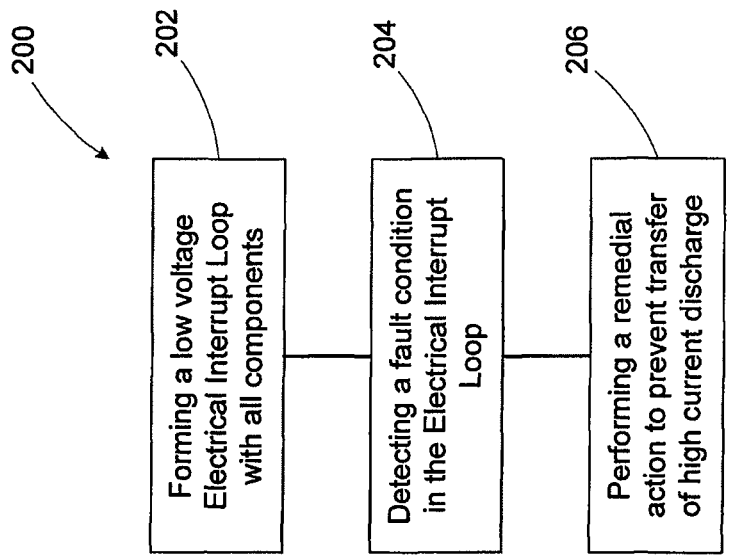
FIG. 6 is an exemplary method in accordance with aspects of the present invention.

An exemplary method 200 for generating an electrical interrupt in a system having a combustible engine and an electric motor in accordance with aspects of the present invention is illustrated in FIG. 6. At block 202, the system includes forming a low voltage electrical interrupt loop by coupling an electrical interrupt loop in serial to each electrical component containing at least one high voltage contact and one or more direct current storage units. At block 204, the system includes detecting a fault condition in the electrical interrupt loop, wherein the fault condition generates an open circuit in the interrupt loop. At block 206, a remedial action is performed to ensure all contacts of each of the electrical components are discharged in order to prevent the transfer of high current discharge. In one embodiment, the remedial action includes disabling a power takeoff device operable to prevent transfer of mechanical energy from the combustible engine to the electric motor. In another embodiment, the remedial action includes disabling the electric motor. As discussed above, a fault condition may include detecting a failure in a cable coupled to at least one high voltage contact.

Figure 7:
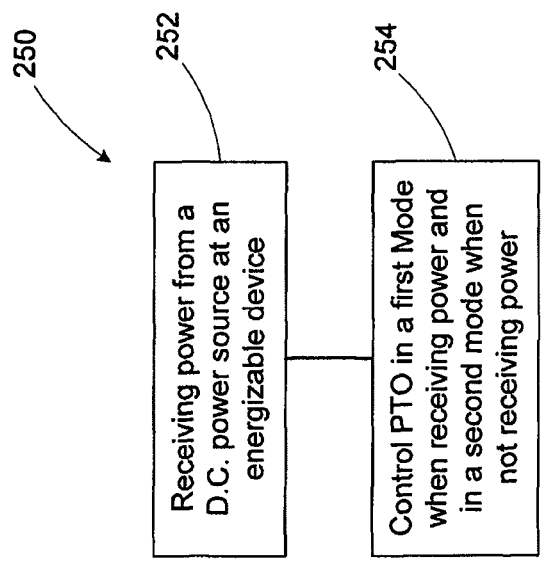
FIG. 7 is another exemplary method in accordance with aspects of the present invention.

Another exemplary method 250 for generating an electrical interrupt is illustrated in FIG. 7. The method 250 includes, at block 252, receiving electrical power from an associated secondary direct current power source at an energizable device. At block 254, a power takeoff device is controlled such that when the energizable device is receiving electrical power from the associated secondary direct current power source, the power takeoff device is operable in a first state to transfer mechanical energy from an associated combustible engine to an associated electric motor and/or generator and when the energizable device is not receiving power from the associated secondary direct current power source a fault is detected and the power takeoff device is operable in a second state to prevent the transfer of mechanical energy from the associated combustible engine to the associated electric motor and/or generator. In one embodiment, the step of controlling the power takeoff device includes operatively coupling a switch controlled by the energizable device between the power takeoff device and the associated secondary direct current power source. Upon detection of a fault condition, the clutch associated with the power takeoff device is disengaged and not re-engageable until all electrical interrupts are reset or fixed and/or the electric motor is preventing from rotating, which generates high voltage output, as discussed above.

Although the invention has been shown and described with respect to one or more exemplary embodiments, it is appreciated that alterations and modifications may occur to others skilled in the art upon reading and understanding the specification and the annexed drawings without departing from the precepts involved herein. It is intended that all matter contained in the foregoing description shall be interpreted as illustrative and not in a limiting sense. In addition, while a particular feature may have been described with respect to only one or more several illustrated embodiments, such feature may be combined with one or more other features of the other embodiments, as may be desired and advantageous for any given or particular application.

What is claimed is:

1. An electrical interlock system including:
    a power takeoff device operable in a first state to transfer mechanical energy from an associated combustible engine to an associated electric motor and/or generator and operative in a second state to prevent the transfer of mechanical energy from the associated combustible engine to the associated electric motor and/or generator;
    a relay coupled to the power takeoff device, the associated electric motor and/or generator and an associated power source, wherein the relay includes a first switch and an energizable portion, such that when the energizable portion is receiving electrical power from the associated power source, the power takeoff device is in the first state and when the energizable portion is not receiving electrical power from the associated power source, the power takeoff device is in the second state; and
    an interlock mechanism serially coupled to an associated low voltage source, the power takeoff device and the relay, such that when the serial coupling is disrupted a fault condition is automatically created and the power takeoff device is operative in the second state to prevent the transfer of mechanical energy to any components in the system.

2. The system of claim 1, wherein the power takeoff device includes a clutch and a solenoid, wherein the solenoid is energizable to control operation of the clutch.

3. The system of claim 2, wherein when the solenoid is energized, the clutch is in the first state and when the solenoid is discharged, the clutch is in the second state.

4. The system of claim 1, further including a controller operatively coupled to the power takeoff device, wherein the controller is operative to control operation of the power takeoff device.

5. The system of claim 4, wherein the controller is coupled to the relay and is operable to control operation of the first switch.

6. The system of claim 1, further including a second switch, wherein the second switch is associated with an energizable actuator such that a fault detected by the solenoid or the energizable actuator places the power takeoff device in the second state.

7. The system of claim 1, further including a rectifier operably coupled to the associated electric motor and/or generator and the associated secondary power source, wherein the rectifier converts electrical power generated by the associated electric motor and/or generator to a direct current for storage by the associated power source.

8. A method for generating an electrical interrupt in a system having electrical components having at least one high voltage contact including a power takeoff device, a combustible engine and an electric motor, the method including:
   forming a low voltage electrical interrupt loop by coupling an electrical interrupt loop in serial to each electrical component containing at least one high voltage contact, one or more direct current storage units, and the power takeoff device;
   detecting a fault condition in the low voltage electrical interrupt loop, wherein the fault condition generates an open circuit in the low voltage electrical interrupt loop;
   performing a remedial action to ensure all contacts of each of the electrical components are touch safe prior to removal of any connectors from the at least one high voltage contact of the electrical components, wherein the remedial action includes preventing the power takeoff device from transferring mechanical energy from the combustible engine to the electric motor.

9. The method of claim 8, wherein the remedial action includes disabling the electric motor.

10. The method of claim 8, wherein the fault condition includes detecting a failure in a cable coupled to the at least one high voltage contact, wherein the low voltage electrical interrupt loop is disrupted by the cable failure and an open circuit condition in the low voltage electrical interrupt loop is automatically created that causes the power takeoff device to be operative in a condition that prevents the transfer of mechanical energy to any components in the system.

11. A method for generating an electrical interrupt, the method including:
   receiving electrical power from an associated secondary direct current power source at an energizable device;
   controlling a power takeoff device such that when the energizable device is receiving electrical power from the associated secondary direct current power source, the power takeoff device is operable in a first state to transfer mechanical energy from an associated combustible engine to an associated electric motor and/or generator and when the energizable device is not receiving power from the associated secondary direct current power source a fault is detected and the power takeoff device is operable in a second state to prevent the transfer of mechanical energy from the associated combustible engine to the associated electric motor and/or generator;
   wherein the second state is automatically triggered when an interlock mechanism serially coupled to the associated secondary direct current power source and the power takeoff device is disrupted, such that when the serial coupling is disrupted a fault condition is created and the power takeoff device is operative in the second state to prevent the transfer of mechanical energy to at least the associated electric motor and/or generator.

12. The method of claim 11, wherein the step of controlling includes operatively coupling a switch controlled by the energizable device between the power takeoff device and the associated secondary direct current power source.

13. The method of claim 11, further including controlling the switch with a controller.

14. The method of claim 11, wherein generation of the fault condition disables engagement of a clutch associated with the power takeoff device.

15. The method of claim 11, wherein generation of the fault condition prevents rotation of the electric motor.

16. The method of claim 11, further including converting electrical power generated by an associated electric motor and/or generator to a direct current for storage by the associated secondary power source.

17. An electrical interrupt system for use in a hybrid vehicle system, the system including:
   a power takeoff device;
   an electric motor operatively coupled to the power takeoff device;
   an inverter coupled to the electric motor, wherein the inverter is operable to receive power from the electric motor and provide power to the electric motor; and
   an electrical interrupt loop including at least one energizable electrical component associated with a least one of the power takeoff device and/or the inverter, wherein the electrical interrupt loop is formed between at least an associated battery and the power takeoff device and
   wherein the energizable electrical component is energizable in response to receiving electric power from an associated battery operably coupled in the electrical interrupt loop, such that an interrupt condition is generated when the energizable electrical component is not receiving electric power from the associated battery, wherein the interrupt condition results from a disruption in a serial connection between the associated battery, the power takeoff device and/or the inverter, wherein upon entering the interrupt condition the power takeoff device is prevented from transferring mechanical energy to any components in the system.

18. The system of claim 17, wherein the interrupt condition prevents energization of the energizable electrical component.

19. The system of claim 17, wherein the interrupt condition prevents the power takeoff device from transferring mechanical energy from an associated combustible engine to the associated electric motor.

20. The system of claim 17, wherein the interrupt condition disables the associated electric motor.

21. An electrical interrupt for use in a system having a plurality of direct current storage units, the system including:
   one or more electrical components having at least one high voltage contact for transferring current to and/or from a plurality of direct current storage units; and
   an electrical interrupt circuit operatively coupled in serial to each electrical component containing a high voltage contact in the system and each of the direct current storage units, wherein an electrical interrupt is triggered by an open circuit in the electrical interrupt circuit and the electrical interrupt results in isolation of each of the associated direct current storage units, and each electrical component containing the high voltage contact is immediately placed in a touch safe condition upon triggering of the interrupt.

22. The electrical interrupt of claim 21, wherein each of the high voltage contacts are substantially immediately placed in a touch safe condition upon triggering of the interrupt by preventing transfer of electrical energy from one electrical component to another component.

\* \* \* \* \*